Patented Mar. 1, 1938

2,109,595

UNITED STATES PATENT OFFICE 2,109,595

POLYMERIZATION OF ORGANIC CHEMICALS

Barnard M. Marks, Arlington, N. J., assignor to E. I. du Pont de Nemours & Company, Wilmington, Del., a corporation of Delaware No Drawing. Application December 17, 1936, Serial No. 116,347

6 Claims. (Cl. 260—2)

This invention relates to the polymerization of organic compounds and, more particularly, to the polymerization of acrylic acid, its homologues and esters thereof.

The polymerization of monomeric unsaturated liquid compounds such as acrylic acid, its homologues as methacrylic acid, and esters thereof, is facilitated or accelerated by various agencies including heat, actinic light and certain chemical compounds having a catalytic effect on the polymerization. These chemical compounds, referred to as catalysts, are generally of the type capable of yielding oxygen; benzoyl peroxide is recognized as the most effective of these. A serious practical disadvantage in the use of benzoyl peroxide is that, in many instances, it tends to cause a yellow discoloration when used in proportions adequate to accelerate the polymerization reaction of these compounds to a satisfactory degree. On the other hand, hydrogen peroxide is a polymerization catalyst for these monomeric compounds and has no tendency to cause discoloration but it has the drawback of being a decidedly weak catalyst; even increasing the concentration of hydrogen peroxide well beyond ordinary catalytic proportions is not effective in speeding up the reaction.

An object of the present invention is to provide an improved catalyst for the polymerization of acrylic acid, its homologues and esters thereof, particularly methyl methacrylate. A further object is to provide such a catalyst that will have a strong catalytic action without causing discoloration of the polymerized product such as results from the use of benzoyl peroxide. A particular object is to provide an improved catalyst in those polymerization processes where the catalyst is brought and maintained in admixture, or at least in very intimate contact, with the material to be polymerized. Other objects of the invention will be apparent from the description given hereinafter.

The above objects are accomplished according to the present invention by using, as a polymerization catalyst for the polymerization of acrylic acid, its homologues and esters thereof, a mixture of benzoyl peroxide and hydrogen peroxide. More specifically, the present invention comprises the use of a mixture of one part of benzoyl peroxide to 1-30 parts of hydrogen peroixde (on an anhydrous basis) as a catalyst in the polymerization of these monomeric compounds. All parts are given by weight throughout the specification and claims and the proportion of hydrogen peroxide is on an anhydrous basis except where otherwise indicated.

The present invention resides in the discovery that the addition of hydrogen peroxide, heretofore well recognized as being merely a weak polymerization catalyst, to a relatively small amount of benzoyl peroxide results, totally unexpectedly, in a catalytic mixture having a strength out of all proportion to the sum of the known strength of its component parts taken individually and yet the mixture has no more tendency to discolor the polymerization product than that attributable to the benzoyl peroxide it contains. Obviously, the discoloring tendency of this catalytic mixture is definitely much less than that of a catalytically equivalent amount of benzoyl peroxide used alone.

While a measurement of strength of catalytic action in quantitative terms is hardly feasible, and since also the comparative catalytic effect of two different catalysts may not remain in the same ratio to each other under different circumstances of temperature, concentration, and the like, it can be stated in general that the catalytic action of one part of benzoyl peroxide, used alone, can be duplicated by the mixture of the present invention when the mixture includes benzoyl peroxide from 0.05 to 0.5 part together with hydrogen peroxide from 1.5 to 0.5 part.

The catalyst of the present invention can be used in any of the various types of processes of polymerization in which the catalyst is brought and maintained in admixture, or at least in very intimate contact, with the material which is to be polymerized. In the various processes of casting anhydrous monomers in molds or forms, and then polymerizing them, the utility of the present invention is not great, since in these processes the amount of catalytic effect required is ordinarily so small that it may be obtained by the use of benzoyl peroxide alone in quantities insufficient to be objectionable. The present invention has its greatest value in the various processes of emulsion polymerization, processes of polymerization in a water-methanol vehicle and processes of polymerization in solution.

The following examples are given to illustrate the use of the herein considered catalyst in various more or less standard polymerization processes. The performance and advantage of the invention are illustrated, for the emulsion polymerization of methyl methacrylate, by Example 1, which sets forth in "A" the process as conducted with benzoyl peroxide alone and in "B" the parallel process as conducted in accordance with the present invention.

*Example 1—A.*—One part of benzoyl peroxide is dissolved in 100 parts of liquid monomeric methyl methacrylate and the solution filtered. An aqueous vehicle is prepared by dissolving 1.25 parts of lauryl sodium sulphate in 200 parts of water and filtering.

The two liquids are then mixed and pass through a colloid mill to effect an emulsification, the lauryl sodium sulphate functioning as an emulsifying agent. The emulsion is heated in a flask at 65° to 75° C. and polymerization of the methyl methacrylate is substantially complete at the end of 60 to 75 minutes. The mixture is now diluted with 800 parts of water and there is added 10 parts of 0.2 molar aqueous solution of alum. The mixture is warmed and stirred until the emulsified polymer is coagulated. The polymer is then separated by filtration, washed and dried.

The polymer obtained in this way has a yellowish color.

*Example 1—B.*—The ingredients used are as follows:

| | Parts |
|---|---|
| Monomeric methyl methacrylate | 100 |
| Benzoyl peroxide | 0.1 |
| Hydrogen peroxide (30% strength) | 4.4 |
| Lauryl sodium sulphate | 1.25 |
| Water | 200 |

The procedure is the same as in Example 1—A except that the hydrogen peroxide is added to the aqueous vehicle.

The polymerization is complete in from 60 to 75 minutes but the polymer, recovered and washed as in Example 1—A, is substantially colorless.

Examples 2—A and 2—B illustrate in similar manner the application of the invention to the polymerization of methyl methacrylate in a methanol-water vehicle.

*Example 2—A.*—One part of benzoyl peroxide is added to 100 parts of monomeric methyl methacrylate and the solution filtered and mixed with 400 parts of methanol and 500 parts of distilled water. This solution is then maintained at a temperature of 65° C. for 18 hours in a closed vessel without stirring. The polymerized methyl methacrylate separates out as a solid, and the resulting spongy mass is squeezed, rinsed with distilled water and dried.

The polymer thus obtained has a yellowish color.

*Example 2—B.*—Ingredients are as follows:

| | Parts |
|---|---|
| Methyl methacrylate | 100 |
| Benzoyl peroxide | 0.1 |
| Hydrogen peroxide (30%) | 3.7 |
| Methanol | 400 |
| Distilled water | 500 |

The same procedure is followed as in Example 2—A, the hydrogen peroxide being added to the water-methanol solution. There is obtained at the end of a period of polymerization similar to that in Example 2—A, a polymer which is substantially colorless.

Examples 3 and 4 illustrate the invention as applied to the polymerization of monomeric methacrylic acid in solution.

*Example 3.*—100 parts of water-white monomeric methacrylic acid are dissolved in 2000 parts of water in a water bath at about 90° C. To this solution are added 0.1 part of benzoyl peroxide and 3.3 parts of hydrogen peroxide (30%) and the heating is continued for about 75 minutes. A viscous mass is obtained comprising polymerized methacrylic acid in aqueous solution, which solution is substantially water-white.

*Example 4.*—The ingredients are as follows:

| | Parts |
|---|---|
| Monomeric methacrylic acid | 10 |
| Water | 1000 |
| Benzoyl peroxide | 0.01 |
| Hydrogen peroxide (30%) | 1 |

Polymerization is conducted as in Example 3, by heating at from 85° to 90° C. for one hour, a water-white solution of polymerized methacrylic acid being obtained.

The invention is further illustrated by Examples 5, 6, and 7.

*Example 5.*—The ingredients used are:

| | Parts |
|---|---|
| Monomeric methyl methacrylate | 100 |
| Benzoyl peroxide | 0.05 |
| Hydrogen peroxide (30%) | 5 |
| Lauryl sodium sulphate | 1.5 |
| Water | 200 |

Following the procedure of Example 1—B the polymerization is effected at 90° C. in about 45 minutes, a substantially colorless product being obtained.

*Example 6.*—The ingredients used are:

| | Parts |
|---|---|
| Monomeric methyl acrylate | 100 |
| Water | 200 |
| Benzoyl peroxide | 0.1 |
| Hydrogen peroxide (30%) | 3.0 |
| Lauryl sodium sulphate | 1.5 |

The procedure of Example 1—B is followed, a substantially colorless product resulting.

*Example 7.*—The ingredients used are:

| | Parts |
|---|---|
| Monomeric acrylic acid | 100 |
| Water | 2000 |
| Benzoyl peroxide | 0.1 |
| Hydrogen peroxide | 4.0 |

The procedure of Example 3 is followed and a substantially water-white solution of polymerized acrylic acid is obtained.

It will be understood that the above examples are merely illustrative and those skilled in the art will appreciate that the catalyst of the present invention may be used in the polymerization not only of the acrylates and methacrylates of the examples but to this class of compounds generally. This class of compounds includes the various homologues of acrylic acid as methacrylic and ethacrylic acids, the alkyl esters of such acids as the methyl, ethyl, propyl and butyl esters and the higher alkyl esters; also esters of cyclohexyl alcohol and dihydric alcohols such as glycol.

As already stated, the catalyst should be used in the proportion of one part benzoyl peroxide to 1–30 parts of hydrogen peroxide. This range of proportion is based on practical considerations; where the catalyst comprises over 50% benzoyl peroxide, the discoloration tendency is such that no appreciable benefit is derived from the present invention while the use of less than one part benzoyl peroxide to 30 parts of hydrogen peroxide gives a catalyst so similar in action to straight hydrogen peroxide that here again the advantages of the present invention are not realized to a practical extent. It is preferred to use a mixture of one part benzoyl peroxide to 5–15 parts of hydrogen peroxide.

The amount of catalyst used per unit weight of monomeric compound to be polymerized will, of course, depend upon the catalytic strength desired and will vary from instance to instance just as the amount of straight benzoyl peroxide used as catalyst has been varied heretofore. The amounts used in the specific examples are quite typical and, in a general way, the relative strength of the present catalyst as compared to benzoyl peroxide has been indicated so that those skilled in the art will know the approximate amount of catalyst to be used. In commercial production, the optimum amount of catalyst under a given set of conditions will be determined by trial runs as usual.

The hydrogen peroxide specified in the examples is the most concentrated commercial grade, which contains about 30% hydrogen peroxide by volume, or 27.2% by weight, in aqueous solution. Obviously, however, in any process conducted in an aqueous medium the equivalent amount of a less concentrated preparation may be used.

It is to be noted that the conditions of the process of polymerization must be such as to bring and maintain the catalyst in admixture, or at least in intimate contact, with the material which is to be polymerized. This condition is fulfilled in processes in which the catalyst is dissolved directly in the polymerizable liquid, or in which both are dissolved in a common vehicle, or in which the polymerizable liquid is emulsified in a liquid vehicle. But in processes in which the liquid undergoing polymerization is maintained in droplets suspended in an aqueous medium, which droplets polymerize to form globules, the present invention is comparatively ineffective, presumably because of the absence of intimate contact of the catalyst with all of the liquid undergoing polymerization.

An advantage of the present invention is that it provides a catalyst which can be used to accelerate the polymerization of the compounds herein considered at a commercially feasible rate without causing discoloration in the finished product.

As many apparently widely different embodiments of this invention may be made without departing from the spirit and scope thereof, it is to be understood that the invention is not limited to the specific embodiments thereof except as defined in the appended claims.

I claim:

1. As a catalyst for the polymerization of acrylic acid, its homologues, and esters thereof, a mixture of 1 part of benzoyl peroxide to 1–30 parts of hydrogen peroxide.

2. As a catalyst for the polymerization of acrylic acid, its homologues, and esters thereof, a mixture of 1 part of benzoyl peroxide and 5–15 parts of hydrogen peroxide.

3. A process comprising intimately admixing a catalyst mixture of 1 part of benzoyl peroxide and 1–30 parts of hydrogen peroxide with monomeric methyl methacrylate and subjecting same to polymerizing conditions.

4. Process comprising dissolving a monomeric compound from the group consisting of acrylic acid, its homologues, and esters thereof, in a water-methanol mixture, intimately admixing a catalyst mixture of 1 part benzoyl peroxide and 1–30 parts of hydrogen peroxide with said solution, and then subjecting said solution to polymerizing conditions.

5. Process comprising emulsifying monomeric methyl methacrylate in water, intimately admixing a catalyst mixture of 1 part benzoyl peroxide and 1–30 parts of hydrogen peroxide with said emulsion, and then subjecting said emulsion to polymerizing conditions.

6. Process comprising dissolving monomeric methacrylic acid in water, intimately admixing a catalyst mixture of 1 part benzoyl peroxide and 1–30 parts of hydrogen peroxide with said solution, and then subjecting said solution to polymerizing conditions.

BARNARD M. MARKS.